(12) United States Patent
Toth

(10) Patent No.: US 6,787,100 B2
(45) Date of Patent: Sep. 7, 2004

(54) MULTIPLE LAYER POWDER METAL BEARINGS

(75) Inventor: James R. Toth, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 67 days.

(21) Appl. No.: 10/272,054

(22) Filed: Oct. 15, 2002

(65) Prior Publication Data

US 2003/0072670 A1 Apr. 17, 2003

Related U.S. Application Data

(60) Provisional application No. 60/330,065, filed on Oct. 17, 2001.

(51) Int. Cl.[7] ................................................. B22F 7/04
(52) U.S. Cl. .............................................. 419/8; 419/9
(58) Field of Search .................................. 419/6, 7, 8, 9

(56) References Cited

U.S. PATENT DOCUMENTS

| 2,289,572 | A | * | 7/1942 | Underwood | 384/243 |
|---|---|---|---|---|---|
| 3,403,010 | A | * | 9/1968 | MacDonald et al. | 428/554 |
| 3,445,909 | A | * | 5/1969 | Beebe, Jr. | 29/898.12 |
| 3,812,563 | A | | 5/1974 | Toaz | 29/149.5 |
| 4,121,928 | A | * | 10/1978 | Mori | 419/3 |
| 4,189,522 | A | * | 2/1980 | Mori | 428/557 |
| 4,206,268 | A | * | 6/1980 | Roemer et al. | 428/643 |
| 4,365,995 | A | * | 12/1982 | Mori | 419/6 |
| 4,505,987 | A | | 3/1985 | Yamada et al. | 428/553 |
| 4,758,404 | A | | 7/1988 | Muto | 419/3 |
| 4,959,274 | A | | 9/1990 | Mori et al. | 428/555 |
| 4,996,025 | A | * | 2/1991 | Pratt et al. | 420/554 |
| 5,041,339 | A | * | 8/1991 | Mori et al. | 428/552 |
| 5,116,692 | A | * | 5/1992 | Mori et al. | 428/650 |
| 5,413,875 | A | * | 5/1995 | Tanaka et al. | 428/645 |
| 5,445,896 | A | * | 8/1995 | Tanaka et al. | 428/647 |
| 5,545,489 | A | * | 8/1996 | Tanaka et al. | 428/629 |
| 5,911,513 | A | * | 6/1999 | Tsuji et al. | 384/276 |
| 6,163,961 | A | * | 12/2000 | McMeekin | 29/898.056 |
| 6,194,087 | B1 | * | 2/2001 | Huhn et al. | 428/646 |
| 6,221,515 | B1 | * | 4/2001 | Ramos Junior et al. | 428/653 |
| 6,267,508 | B1 | * | 7/2001 | Bank et al. | 384/276 |

* cited by examiner

Primary Examiner—Daniel Jenkins
(74) Attorney, Agent, or Firm—Howard & Howard

(57) ABSTRACT

A method of fabricating multi-layer bronze bearings includes laying down a first layer of copper-based powder metal material of a first composition onto a steel backing strip. At least a second layer of copper-based powder metal material of a second composition different than that of the first is laid down on the first layer, without significantly densifying the first layer.

The layers are then sintered, cooled, and roll compacted to bond them to one another and to the backing, after which the layers are further sintered.

5 Claims, 1 Drawing Sheet

MULTIPLE LAYER POWDER METAL BEARINGS

The disclosure incorporates the multiple layer powder metal bearings assembly and method of manufacture disclosed in provisional application 60/330,065 filed Oct. 17, 2001, whose priority is claimed for this application.

BACKGROUND OF THE INVENTION

1. Technical Field

This invention relates generally to steel-backed bronze powder metal engine bearings.

2. Related Art

In the manufacture of copper-based engine bearings and bushings (collectively bearings), one common approach to bonding a copper-based functional layer to the steel backing is by a process which involves applying a single layer of bronze bearing material onto a moving backing strip which is subsequently sintered, cooled, roll compacted and then post-sintered. An overlay, such as tin or lead-tin-copper is often applied by electroplating or physical vapor deposition over the sintered bronze bearing layer to achieve good conformability and embedability properties of the bearing. Another approach to bonding the bronze functional layer is to cast such a layer onto a moving steel backing strip from a molten source, after which the cast functional layer can receive an overlay in a separate electro- or physical-vapor deposition process to enhance conformability and embedability of the bearing.

One inherent drawback to each of the above alternatives for preparing copper-based functional layers is that they are limited to application of a single copper-based alloy material. Depending upon the requirements of a given application, the chemistry of the powder metal or cast bronze functional layer is adjusted, such that the entirety of the functional layer is made up of the same alloy material.

With an ever-increasing demand on the load and wear requirements of bearings and the desire to minimize usage of certain elements, such as lead, the cost of preparing copper-based substitute alloys that satisfy all of the requirements of modern bearing and bushing applications becomes increasingly more challenging, particularly since the functional layer is typically the thickest of the layers applied to the steel backing.

What the inventor of the present application has recognized is that in many applications, it would be satisfactory to provide only a portion of the functional layer with a high performance/high cost copper-based alloy material, whereas the balance of the material of the functional layer could be of a lesser performance and less costly material, but for the limitations of the current processes available for preparing single layer bronze functional layers on steel backings. It is, accordingly, an object of the present invention to provide a method of forming multi-layer bronze functional layers on steel backings of bearings.

SUMMARY OF THE INVENTION AND ADVANTAGES

A method of fabricating multiple layer powder metal copper-based bearings according to a presently preferred process of the invention involves laying down a first layer of copper-based powder metal alloy on a metal backing strip and, without substantially densifying the first layer, laying down at least a second layer of copper-based powder metal alloy on top of the first layer, with the at least second layer being of different composition than that of the first layer. Further without substantially densifying the layers, the layers are subjected to a first sintering step after which the layers are cooled and then compaction rolled against the metal backing strip to densify and bond the layers to the backing strip and one another. Following compaction rolling, the layers are subjected to a second sintering step.

The inventor has found that by applying a first copper-based powder layer onto the steel substrate and thereafter applying at least a second layer of copper-based powder metal bearing material onto the first layer without substantially densifying the first layer followed by a first sintering and cooling operation after which the layers are roll bonded and subsequently sintered, that a multi-layer copper-based powder metal functional bearing material can be efficiently bonded to one another and to the steel backing, with the freedom to select the desired chemistries of the first and second layers in order to tailor the end properties of the functional layer.

This invention has the advantage of providing the ability to use a less expensive copper-based material for one layer in combination with a more expensive material for the remaining layer or layers.

The invention has a further advantage of being readily adaptable to existing sintering lines with little modification.

According to a particular feature, the first layer can be fabricated from relatively inexpensive copper-tin powder metal alloy and be made relatively thick, whereas the second layer can be fabricated of copper-tin-bismuth, or another specialty powder metal alloy, that serves as a substitute for lead-containing bronzes.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
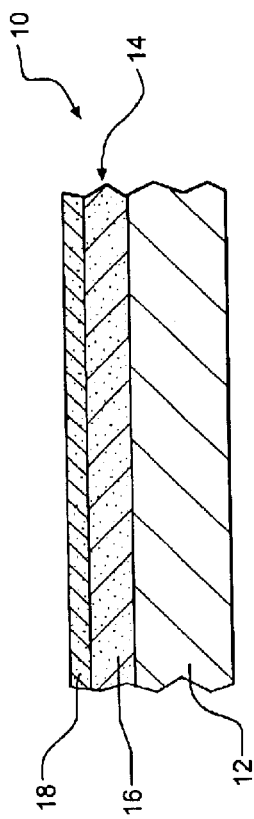
FIG. 1 is a schematic fragmentary sectional view of a bearing fabricated according to the invention.

A multi-layer powder metal sliding bearing or bushing (collectively bearing) constructed according to the invention is shown generally at 10 in FIG. 1 and comprises a steel backing 12 onto which a multiple layer sintered powder metal liner 14 is applied made up of at least a base layer 16 and an outer surface layer 18, both of which are copper-based sintered powder metal alloy layers, but of different composition and/or individual properties which, when combined, provide the composite liner 14 with the desired properties of a bearing liner 14.

According to the invention, the material at the surface 18 can be a first copper-based powder metal alloy composition which has the desired properties suitable for sliding engagement with a rotary shaft, pin, or other component supported by the bearing 10 for sliding movement across the running surface of the surface layer 18. Powder metal compositions having the desirable properties for the surface layer are characteristically more costly due to the necessary alloy additions need to obtain such property. This relatively expensive surface layer 18 can be backed by at least one less costly backing layer 16 of a second copper-based powder metal composition which provides the needed support to the surface layer but which does not need to possess the same properties as the surface layer in order to provide the overall bearing liner 14 with the required end properties. In the example shown, the surface layer 18 is advantageously thinner than the backing layer 16, contributing to the cost savings.

Accordingly, the layers, 16, 18 can have different chemistries and therefore different properties and costs. This allows the application of a lower strength, high lubricity, high cost layer 18 on top of a stronger, simpler, low cost layer 16 yielding overall an increase in performance of the composite liner 14.

It is preferred that the powder metal layers be copper based allows which are essentially lead-free (<0.1% lead). For example, the base layer 16 can be a 90/10 copper-tin powder metal layer backing the surface layer 18 which could be, for example, a copper-tin-bismuth powder metal layer wherein the layer has about 90 parts copper to 10 parts tin and bismuth in the range of about 2 to 10 weight percent to that of the copper and tin combined. Other copper alloys and chemistries are contemplated by the invention and are incorporated herein by reference. Of course, the layers 16, 18 are selected to be compatible with one another such that they bond readily to the backing strip 12 and to one another during the sintering operation.

Figure 2:
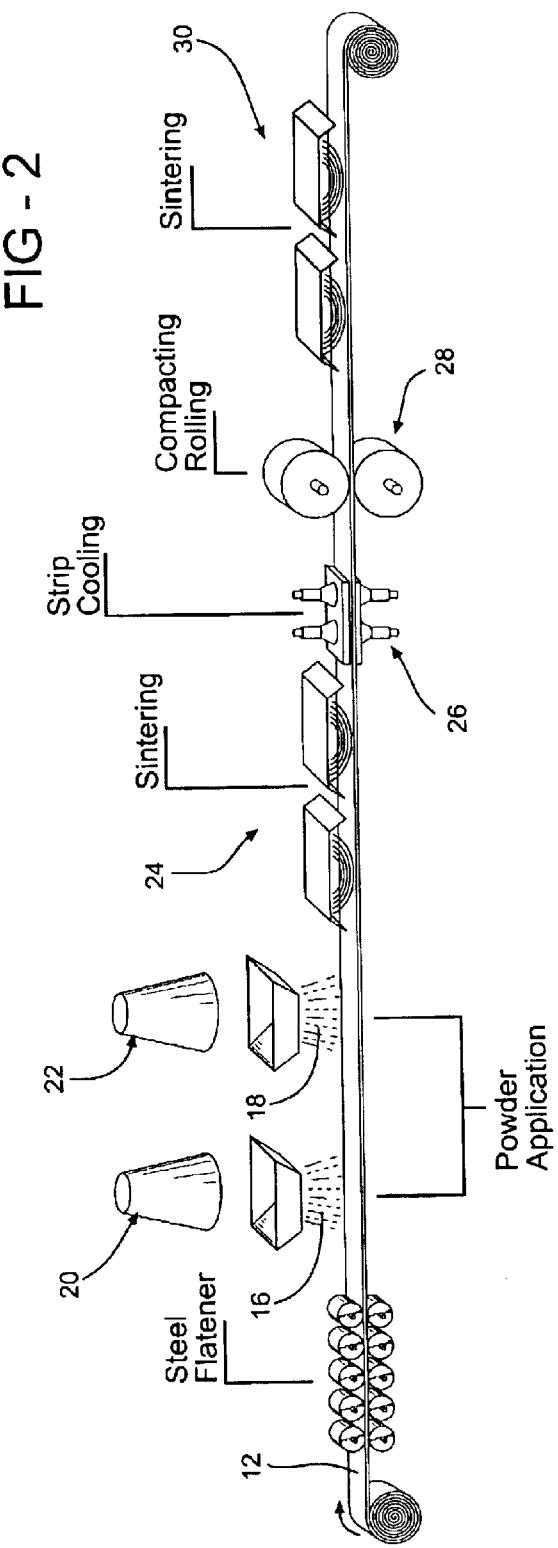
FIG. 2 is a schematic view illustrating the method of the invention.

FIG. 2 schematically illustrates a process for making such a multi-layer sintered bearing. The strip 12 is passed beneath a first powder applicator 20 which lays down the base layer 16 and then advances beneath a second powder applicator 22 which lays down the surface layer 18 without having substantially densified the powder metal material of the base layer 16. Preferably, the powder layers are loosely applied to the backing without any roll densification prior to sintering, although the invention contemplates a certain amount of compaction for powder control, but not so great as to significantly densify the base layer prior to application of the second layer (i.e., <80% of full theoretical density), or significant densification of the second layer prior to sintering (e.g., <80% of full theoretical density). The strip 12 is advanced through a sintering zone 24 where the layers are sintered and then through a cooling zone 26 followed by passage through calendar rollers 28 which compress and bond the layers to the strip and to one another, after which the partially sintered and rolled layers 16, 18 are further completely sintered in a final sintering zone 30. Of course, additional layers could be added such that there are three or more layers whereby three or more powder application zones are added to the process if desired. The loose layering of the copper-based powder layers provides good cohesion of the layers to one another and to the backing.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of fabricating multiple layer powder metal copper-based bearings, comprising;

laying down a first layer of copper-based powder metal alloy on a metal backing strip;

without first substantially densifying the first layer, laying down at least a second layer of copper-based powder metal alloy on top of the first layer, with the at least second layer being of a different composition than that of the first layer;

without substantially densifying the layers, subjecting the layers to a first sintering step;

cooling the layers following the first sintering step and thereafter compaction rolling the layers against the metal backing strip to densify and bond the layers to the backing and one another; and following compaction rolling, subjecting the layers to a second sintering step; wherein the layers are selected to be essentially lead-free compositions.

2. The method of claim 1 wherein said first layer comprises a copper-tin alloy and said at least second layer comprises a copper-tin-bismuth alloy.

3. The method of claim 2 wherein the bismuth of the at least second layer allow is present in an amount equal to about 2 to 10% by weight.

4. The method of claim 1 wherein the first layer is relatively thicker than the at least second layer.

5. The method of claim 1 wherein the backing strip is fabricated of steel.

\* \* \* \* \*